Feb. 3, 1970  A. NORWICH  3,493,855
CAPACITIVE MOISTURE GAUGE WITH SIGNAL LEVEL CONTROL USING
A DIFFERENTIAL CAPACITOR IN THE INPUT AND FEEDBACK
CIRCUITS OF AN AMPLIFIER
Filed April 27, 1967
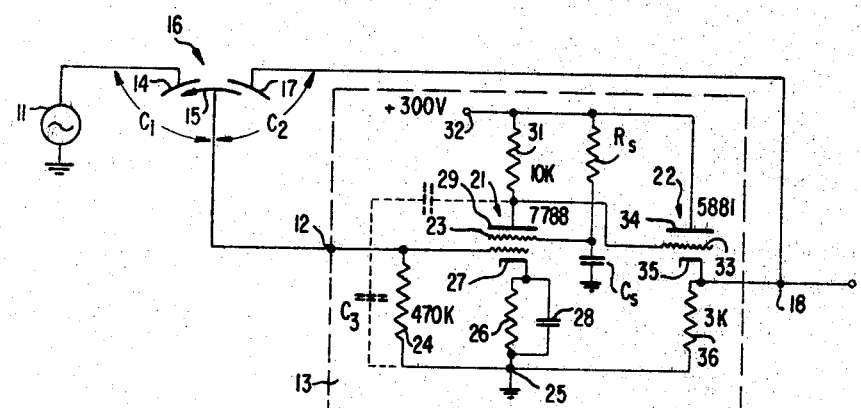
FIG.1
FIG.2
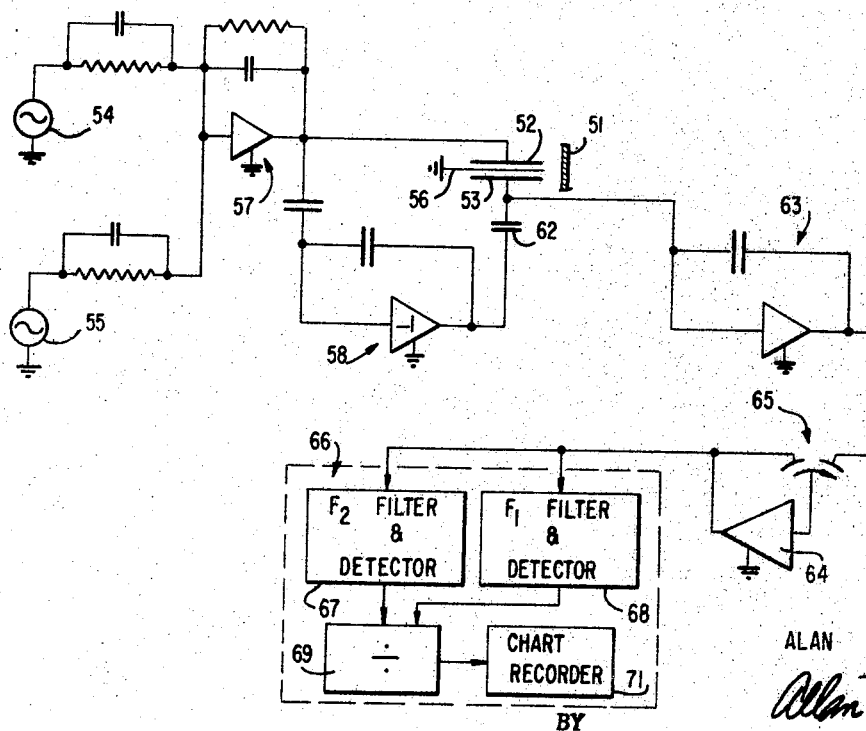
INVENTOR
ALAN NORWICH
ATTORNEY

3,493,855
CAPACITIVE MOISTURE GAUGE WITH SIGNAL LEVEL CONTROL USING A DIFFERENTIAL CAPACITOR IN THE INPUT AND FEEDBACK CIRCUITS OF AN AMPLIFIER
Alan Norwich, Columbus, Ohio, assignor to Industrial Nucleonics Corporation, a corporation of Ohio
Filed Apr. 27, 1967, Ser. No. 634,290
Int. Cl. G01r 27/26, 19/00, 29/16
U.S. Cl. 324—61                                            1 Claim

ABSTRACT OF THE DISCLOSURE

Disclosed is a system for providing a variable gain over an extremely wide range, particularly adapted for monitoring signals derived from measuring the moisture properties of a sheet by capacitive means. The scaling device comprises a relatively high gain amplifier having an input coupled through first and second electrodes of a differential capacitor. A feedback circuit from the amplifier output to its input is formed between the second electrode and a third electrode of the differential capacitor.

---

The present invention relates generally to systems for changing the level of a signal and more particularly to a system including an amplifier having its input terminal connected to a source and a feedback path through a differential capacitor.

In many on-line monitoring applications, the monitored signal amplitude varies widely as different processes are examined. For example, in systems for measuring the moisture content of a paper web during manufacture by sensing the capacitance of the web, the mean signals levels can differ from each other by factors as great as 45:1. In particular, the signal level derived when monitoring a thin relatively dry sheet of tissue paper may be 45 times less than for a moist cardboard sheet. Of course, it is desirable for a single signal scaling device to be utilized for all measurements over the 45:1 amplitude range and to provide the required gain, without substituting one scaling device for another.

A further important factor for circuits providing scale changing and signal level amplification in capacitance moisture measuring applications is bandwidth. In a frequently employed technique for measuring moisture, one or more frequencies are simultaneously applied to a capacitance probe. Depending upon the properties of the sheet being monitored, the frequencies may lie anywhere in the spectrum between 1000 Hz. and 530 kHz.

One of the seemingly obvious approaches to providing the required scale factor variations is to employ a relatively high gain amplifier having variable gain determined by the setting of multi-turn variable resistance in a feedback path around the amplifier. Amplifiers with a high frequency cut off and solely resistive feedback, however, have a tendency to oscillate. Oscillation occurs because, at some relatively high frequency within the pass band, the distributed capacitances of the amplifier, the feedback resistance and the amplifier input combine to produce a phase lag of 180°. This 180° phase shift, together with the 180° phase shift introduced by the phase reversing properties of the amplification stages, causes the amplifier to oscillate, thereby precluding an accurate measurement of moisture.

A further problem with the variable resistor approach is that multi-turn resistance wire potentiometers have considerable inductance and capacity. Inductance occurs because of coupling between adjacent winding turns, while appreciable capacitance is introduced between the windings and a copper mandrel on which the resistance wire is wound. The potentiometer inductance and capacitance additionally phase shift the amplifier output, whereby additional instabilities may result.

To overcome the oscillation problems associated with a multi-turn potentiometer, it is the usual practice in the prior art to shunt the feedback path with a capacitor. The shunting capacitor removes any tendency of the circuit to oscillate at high frequency. For relatively high frequency applications, however, the shunting capacitor provides a constant low impedance feedback path around the potentiometer, whereby the amplifier gain remains somewhat independent of the potentiometer setting and wide scale factor variations cannot be achieved.

Another problem associated with the use of multi-turn potentiometers for establishing the scale factors is that the resolution of the setting is determined by the number of turns per unit length of the resistance winding. Even with expensive potentiometers, having 10 turns or more, there is only a finite number of settings that can be achieved. In addition, multi-turn resistance potentiometers suffer from the problems of dirt on the contact and wire, as well as the usual problems inherent in a relatively complex mechanical linkage.

In accordance with the present invention, the problems of the prior art are overcome by connecting one electrode of a differential capacitor to the input terminal of a relatively high gain amplifier. The remaining electrodes of the differential capacitor are coupled to the moisture measuring circuit and the amplifier output, respectively. The latter connection between the amplifier output and input terminals forms the only negative feedback path around the amplifier. The problem of oscillation is obviated because the shunt input and feedback loop capacitances of the amplifier form a capacitance voltage divider for the amplifier output thereby precluding the introduction of additional phase lags by the scale or gain changing elements. In addition, there is virtually zero resistance or inductance in the feedback path, precluding coupling of high frequency in phase signals back to the amplifier input from its output.

The use of a different capacitor in the input and feedback circuits of the amplifier results in an amplifier gain that is substantially proportional to the ratios of the amplifier input and feedback capacitors. Thereby, virtually infinite scale factor resolution can be achieved with a single capacitive element.

Another advantage of the differential capacitor approach is that both the input and feedback capacitors have a tendency to vary similarly as a function of temperature. Since gain is the ratio of two capacities that vary together as a function of temperature, the output voltage of the scale factor network of the present invention is relatively constant as a function of temperature, for a particular capacitor setting.

It is, accordingly, an object of the present invention to provide a new and improved signal amplifying system for introducing variable scale factors over an extremely wide range with approximately infinite resolution.

Another object of the present invention is to provide a system for deriving variable scale factors over a relatively wide range by employing a high gain amplifier having a feedback loop, wherein the amplifier is not susceptible to high frequency oscillation.

Still another object of the present invention is to provide a scale factor introducing circuit, capable of gain adjustment over a 45:1 range and a maximum gain of at least 10.

Yet another object of the present invention is to provide a new and improved network for changing the level of an AC signal over a wide range, while maintaining constant gain as a function of temperature.

An additional object of the present invention is to provide a new and improved scale factor network for AC signals, which network has a wide range and high resolution, and does not employ wire wound potentiometers.

Still another object of the present invention is to provide a new and improved system particularly adapted for changing the signal level of a capacitive moisture gauge.

Another object of the present invention is to provide a system for enabling the same circuit to be utilized for controlling the signal amplitude derived from a capacitive moisture gauge, regardless of the material being monitored by the gauge.

The above and still further objects, features and advantages of the present invention will become more apparent upon consideration of the following detailed description of one specific embodiment thereof, especially when taken in conjunction with the accompanying drawings, wherein:

FIGURE 1 is a circuit diagram of one preferred embodiment of the present invention; and FIGURE 2 is a schematic drawing to illustrate the measuring system in which the amplifier of FIGURE 1 is adapted to be utilized.

Reference is now made to FIGURE 1 of the drawings wherein constant frequency, variable amplitude AC source 11 is coupled to the input terminal 12 of DC coupled amplifier 13 via electrodes 14 and 15 of differential capacitor 16. The remaining electrode 17 of differential capacitor 16 is connected in a feedback loop around amplifier 13 beween the amplifier output terminal 18 and its input terminal 12. Capacitor 16 is constructed so that the capacity between plates 14 and 15 increases as the capacity between plates 15 and 17 decreases, and vice versa, for movement of rotary or variable electrode 15. Maximum capacity of capacitor 16 between plates 14 and 15 or plates 15 and 17 is on the order of 26 picofarads, while the minimum capacity between plates 14 and 15 is 1.5 picofarads and the minimum capacity between plates 15 and 17 is 5 picofarads.

For the purpose of the present invention, the capacitor is arranged so that the maximum and minimum ratios $C_1/C_2$ are approximately 10 and 0.2, respectively, where:

$C_1$ is the capacity between electrodes 14 and 15; and
$C_2$ is the capacity between electrodes 15 and 17.

Amplifier 13 may be any high gain amplifier constructed to provide a relatively large gain compared to the maximum capacitance ratio, $C_1/C_2$. In a specific embodiment, amplifier 13 comprises a pair of tubes 21 and 22, which are preferably tube types 7788 and 5881, respectively. Grid 23 of tube 21 is connected through grid-leak resistor 24; preferably having a value of 470 kilohms, to the ground terminal 25 while class A biasing is established through resistor 26 to cathode 27. Resistor 26 is bypassed for AC by capacitor 28, whereby the amplifier low frequency cut-off is on the order of 100 Hz. Plate 29 of tube 21 is connected through 10 kilohm resistor 31 to the positive 300 volt DC source maintained at terminal 32, to derive an amplified replica of the AC signal applied to amplifier 13 at terminal 12. The screen of tube 21 is connected to a screen supply resistor $R_s$ and a decoupling capacitor $C_s$. The circuit values illustrated here may vary, depending on the amplifier employed. The AC voltage developed across load 31 is direct coupled to grid 33 of tube 22, that is connected as a low output impedance cathode follower. The cathode follower connections are established by connecting plate 34 of tube 22 directly to the DC voltage at terminal 32 and by connecting cathode 35 through resistor 36, having a value of approximately 3000 ohms, to ground. The described circuit configuration of amplifier 13 provides an open loop gain on the order of 280 with a phase shift of approximately 35 degrees for input signals of approximately 500 kHz.

Mathematically, it can be shown that the closed loop gain, $A'$, of the circuit illustrated in FIGURE 1, between the ungrounded end of source 11 and output terminal 18 of amplifier 13 can be expressed as:

$$\frac{E_0}{E_1} = A' = -\frac{C_1}{C_1+C_2+C_3} \cdot \frac{\overline{A}}{1+\overline{A}\frac{C_2}{C_1+C_2+C_3}} \quad (1)$$

where:

$E_0$ is the voltage between terminal 18 and ground;
$E_1$ is the voltage of source 11;
$C_3$ is the stray capacity of tube 21 between grid 23 and ground terminal 25 and grid 23 and anode 29;
$\overline{A}$ is the open loop gain of amplifier 13. Rewriting Equation 1 yields:

$$A' = -\frac{C_1}{C_1+C_2+C_3} \cdot \frac{1}{\frac{1}{\overline{A}}+\frac{C_2}{C_1+C_2+C_3}} \quad (2)$$

Since the ratio $$\frac{C_2}{C_1+C_2+C_3}$$

is always two orders of magnitude greater than the reciprocal of the open loop amplifier gain, $1/\overline{A}$, the $1/\overline{A}$ term in Equation 2 can be ignored. In consequence, the closed loop gain can be expressed as:

$$A' \doteq -\frac{C_1}{C_2} \quad (3)$$

From Equation 3 it is seen that the output voltage of amplifier 13 is a function solely of the position of rotor 15 of capacitor 16, i.e., the ratio of $C_1$ to $C_2$. Because the only impedance in the feedback path of amplifier 13, between its input terminal 12 and output terminal 18, is the capacity between electrodes 15 and 17, and the feedback path includes no resistors either in series or parallel with the capacity $C_2$, it is impossible for the closed loop amplifier to oscillate regardless of the amount of attenuation or gain introduced by the relative values of $C_1$ and $C_2$. Because the closed loop gain is governed solely by the ratio of $C_1$ to $C_2$, very wide control of signal level between terminal 18 and the voltage developed by source 11 is possible.

Another advantage of the differential capacitor 16 in the input and feedback circuits of amplifier 13 is that changes in values of one capacitor are reflected in similar changes in value of the other capacitor. Since the gain of amplifier 13 depends on the ratio of $C_1$ to $C_2$, the closed loop gain of the system between the output terminal of source 11 and terminal 18 remains constant as a function of temperature.

Capacitor 16 is preferably of the type wherein a screw translates a metal piston that overlaps a pair of adjacent film electrodes. Such a capacitor is commercially available and has the desirable characteristic of maintaining the ratio of $C_1/C_2$ relatively fixed, despite changes in ambient temperature.

Reference is now made to FIGURE 2 of the drawings, wherein there is illustrated an amplifier of the present invention in combination with a system for measuring the moisture properties of sheet material 51. Sheet material 51, which in typical instances comprises a moving sheet of paper emerging from a Fourdrinier wire in a paper manufacturing process, responds to the AC field between plates 52 and 53 of a capacitor comprising a moisture gauge. The moisture gauge comprising capacitors 52 and 53, as well as grounded shield 56, between them, is excited by one or more signal frequencies. In a typical example, two signal frequencies are provided by AC sources 54 and 55 having constant frequencies on the order of 100 kHz. and 530 kHz., respectively. The invention may be employed with substantially equal utility to a single frequency system.

The 40 volt peak to peak voltages generated by sources 54 and 55 are summed in fixed gain, feedback amplifier 57. The output voltage of amplifier 57 is applied to plates 52 and 53 in opposite phase relations. Precisely a 180° phase shift to both frequencies of the voltage applied to plate 53 is accomplished with negative feedback amplifier network 58. The output voltage of amplifier network 58 is coupled to plate 53 via capacitor 62 while the output of amplifier 57 is fed directly to plate 52.

The voltages developed between capacitor 62 and electrode 53 to ground, indicative of the moisture in sheet 51, are amplified a predetermined amount in preamplifier 63. The output voltage of preamplifier 63 is applied to variable gain amplifier 64, constructed exactly like the amplifier shown in FIGURE 1. The median voltage level applied to amplifier 64 may vary over a 45:1 range, depending on the type of paper 51 being monitored and the moisture content thereof. To normalize the voltage level derived from negative feedback amplifier 64, whereby voltages on the same order of magnitude are fed by the amplifier to data analyzer 66, regardless of the paper type being analyzed, the ratio of the two capacitors comprising differential capacitor 65 is adjustable over a 45:1 range. The ratios of the input to feedback capacitances of capacitor 65 are conveniently selected in the range between approximately 0.2 and 10 to achieve substantially a 45:1 attenuation variation, i.e., $C_1/C_2$ in Equation 3 is variable between 0.2 and 10. The maximum capacitance ratio of 10 is desirable to maintain a reasonable closed loop gain for amplifier 64, while the minimum ratio of 0.2 prevents undue signal attenuation. The scale factor change and phase shift introduced by amplifier 64 and capacitor 65 are the same for the frequencies of sources 54 and 55, even though there is approximately a 2.5 octave separation in the frequencies. In addition, there are no problems of oscillation or stability associated with the circuitry of amplifier 64 and capacitor 65, even though the amplifier has a closed loop, high frequency cut-off of approximately 80 mHz.

Data processor 66 includes a pair of bandpass filters and amplitude detectors 67 and 68, driven in parallel by the signal derived from amplifier 64. The filters in each of networks 67 and 68 are relatively high Q to pass the frequency from one of sources 54 and 55 to the exclusion of the other. The DC voltage derived from network 67 is divided by the signal from network 68 in division circuit 69 to provide a measure of the moisture in sheet 51. The DC output of division circuit 69 drives the pen of chart recorder 71, that provides a visual record of the moisture in sheet 51 as a function of time. The scale factor introduced by amplifier 64 can be visually marked on the chart at the beginning of a monitoring cycle for convenience.

If a single frequency system is employed, different data processing equipment may be necessary. In this case, the DC output of the filter and detector can be compared with a fixed DC voltage to derive an error signal. A servo may be used to respond to the error signal to change the level of excitation coupled to the measuring probe. Movements of this servo may be translated by a marking indicator into values of moisture content.

I claim:

1. A system for measuring the moisture content of an article comprising a pair of capacitor electrodes spaced from each other and coupling AC voltage to the article, a pair of AC voltage sources at displaced frequencies, a load impedance, means connecting said impedance with said sources and said electrodes for developing an AC signal across said impedance indicative of the moisture of the article, said connecting means including for both said frequencies a 180° phase reversing means between said source and only one of said electrodes, a variable gain amplifier network for both said frequencies responsive to the voltage across said load, said amplifier network including: in put and output terminals, a first capacitance connected to be responsive to the voltage across said load and feeding said input terminal, a second capacitance connected in series between said input and output terminals to form a negative feedback path for said amplifier, said second capacitance constituting the only impedance in said feedback path, and means for increasing the value of one of said capacitances while decreasing the value of the other of said capacitances, the gain of said amplifier being much greater than the ratio of the values of said capacitances, whereby the gain of said amplifier is approximately equal to the ratio of said first capacitance to said second capacitance.

References Cited

UNITED STATES PATENTS 3,231,659  1/1966  Mabuchi _____ 330—107
3,241,062  3/1966  Baird _____ 324—61

EDWARD E. KUBASIEWICZ, Primary Examiner

U.S. Cl. X.R.

324—107